US012766946B2

(12) United States Patent
Tollari et al.

(10) Patent No.: US 12,766,946 B2
(45) Date of Patent: Oct. 20, 2026

(54) ROAD CAR WITH SIDE EXHAUSTS

(71) Applicant: FERRARI S.P.A., Modena (IT)

(72) Inventors: Davide Tollari, Modena (IT); Angelo Fumarola, Modena (IT); Andrea Merulla, Modena (IT); Roberto Fulvio Muci, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 19/173,026

(22) Filed: Apr. 8, 2025

(65) Prior Publication Data

US 2025/0319762 A1 Oct. 16, 2025

(30) Foreign Application Priority Data

Apr. 11, 2024 (IT) ........................ 102024000008233

(51) Int. Cl.
*B60K 13/04* (2006.01)

(52) U.S. Cl.
CPC .................................... *B60K 13/04* (2013.01)

(58) Field of Classification Search
CPC ............. B60K 13/04; B60K 5/12; B60K 5/02
See application file for complete search history.

(56) References Cited

U.S. PATENT DOCUMENTS 5,388,408 A * 2/1995 Lawrence ............... F01N 13/02 181/239
7,690,472 B2 * 4/2010 Kato ...................... B60K 17/34 180/291
7,878,286 B2 2/2011 Kobayashi et al.
2014/0116796 A1 * 5/2014 Poulin ..................... F01N 13/08 60/281
2018/0111469 A1 * 4/2018 Laimboeck .............. B60K 6/40
2021/0276413 A1 * 9/2021 Shimanaka .......... B62D 25/025
2021/0276626 A1 9/2021 Shimanaka et al.
2023/0311639 A1 * 10/2023 Nakano .................... B60K 5/00 180/296

FOREIGN PATENT DOCUMENTS

DE 102009008799 A1 9/2010
DE 102018213673 A1 2/2020

OTHER PUBLICATIONS

International Search Report and Written Opinion in IT Application No. 202400008233, mailed Oct. 24, 2024, an English translation attached hereto (7 pages).

* cited by examiner

*Primary Examiner* — Hoang M Nguyen
(74) *Attorney, Agent, or Firm* — Leason Ellis LLP

(57) ABSTRACT

A road car has a passenger compartment, a front engine mounted in front of the passenger compartment, two under-door side members, each mounted under a relative access door of the passenger compartment, a front axle provided with a pair of front wheels, a pair of side exhaust ducts, each at least partly extending between a relative under-door side member and a relative front wheel, being at least partly aligned with the relative front wheel in a travel direction of the road car and being configured to release the exhaust gases produced by the engine and to at least limit the movement of the relative front wheel following a front crash of the road car.

8 Claims, 3 Drawing Sheets

ROAD CAR WITH SIDE EXHAUSTS

CROSS-REFERENCE TO RELATED APPLICATIONS

This patent application claims priority from Italian patent application no. 102024000008233 filed on Apr. 11, 2024, the entire disclosure of which is incorporated herein by reference.

TECHNICAL FIELD

The invention relates to a road car.

BACKGROUND

In particular, the invention relates to a road car comprising a support frame defining at least part of a lower floor of the road car; a passenger compartment projecting upwards from the lower floor; and a front engine mounted in front of the passenger compartment and in a central area of the road car.

The support frame comprises two under-door side members, each mounted under a relative access door of the passenger compartment, and a pair of front struts, which protrude from the passenger compartment parallel to a travel direction of the road vehicle and support a front axle provided with a pair of front wheels.

The support frame further comprises a pair of elongated pillars, each extending upwards from the lower floor and being mounted between a relative under-door side member and a relative front wheel.

The road car is also provided with an exhaust system to let out the exhaust gases produced by the engine.

Generally speaking, the exhaust system comprises a pair of exhaust ducts, which are connected to the engine, extend under the lower floor of the road car and have respective outlet mouths obtained at the back of the passenger compartment.

The support frame has, for each front wheel, a respective buffer strut, which projects from the passenger compartment parallel to and on the outside of the relative front strut and is aligned with the front wheel parallel to the travel direction of the road car to limit the front wheel getting close to the passenger compartment in case of front crashes of the road car.

Alternatively, when the road car lacks buffer struts, the aforementioned elongated pillars are sized so as to absorb at least part of the kinetic energy produced by a front crash of the road car.

Known road cars of the type described above suffer from some drawbacks, which are mainly due to the fact that the presence of the buffer struts or the dimensions of the aforementioned elongated pillars lead to a relatively large weight of the road car and can compromise the aerodynamic performances of the road car.

SUMMARY

The object of the invention is to provide a road car that does not suffer from the drawbacks discussed above and can be manufactured in simple and economic fashion.

According to the invention, there is provided a road car as claimed in the appended claims.

BRIEF DESCRIPTION OF THE DRAWINGS

The invention will now be described with reference to the accompanying drawings showing a non-limiting embodiment thereof, wherein.

DESCRIPTION OF EMBODIMENTS

Figure 1:
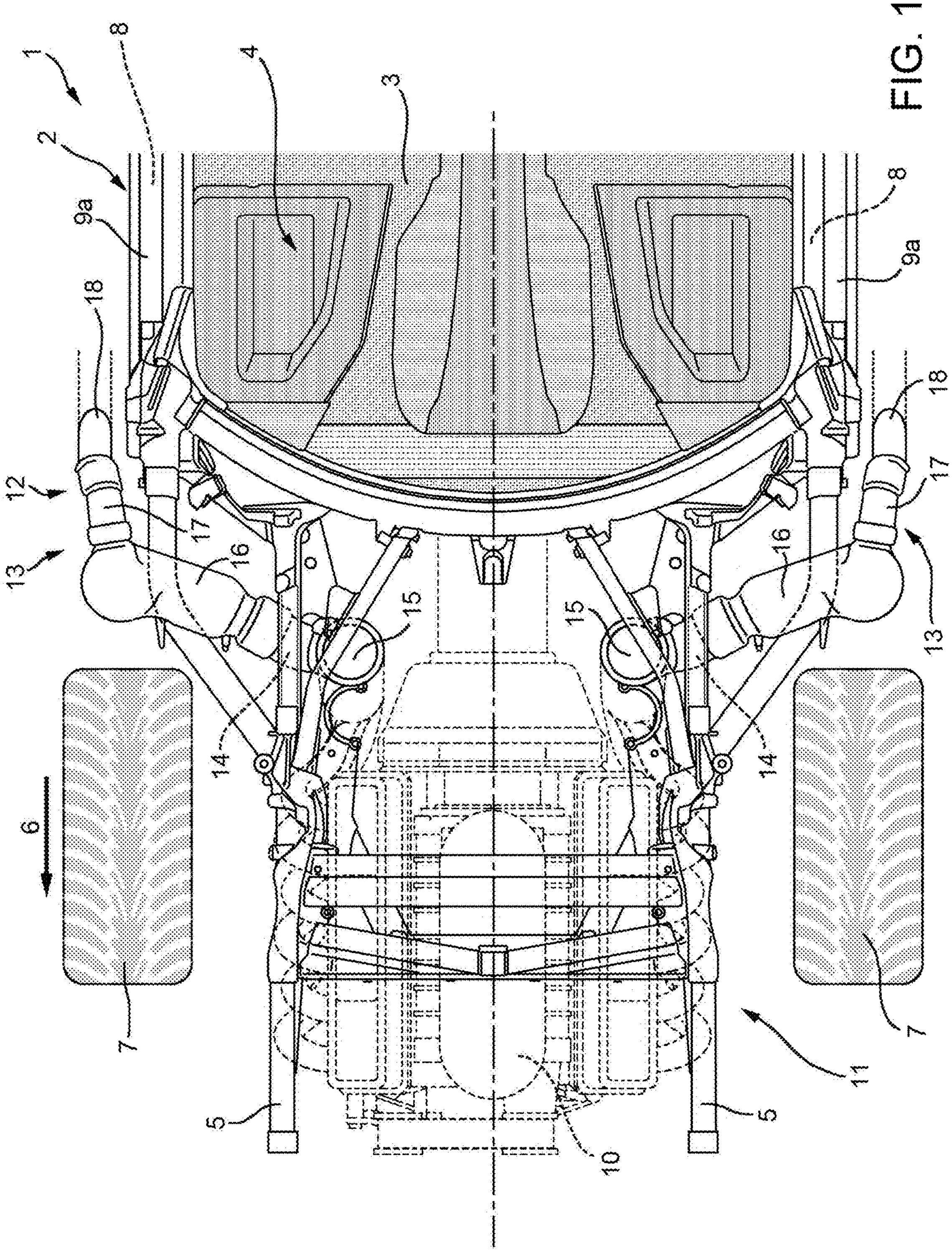
FIG. 1 is a schematic plan view, with parts removed for greater clarity, of a preferred embodiment of the road car according to the invention.
Figure 2:
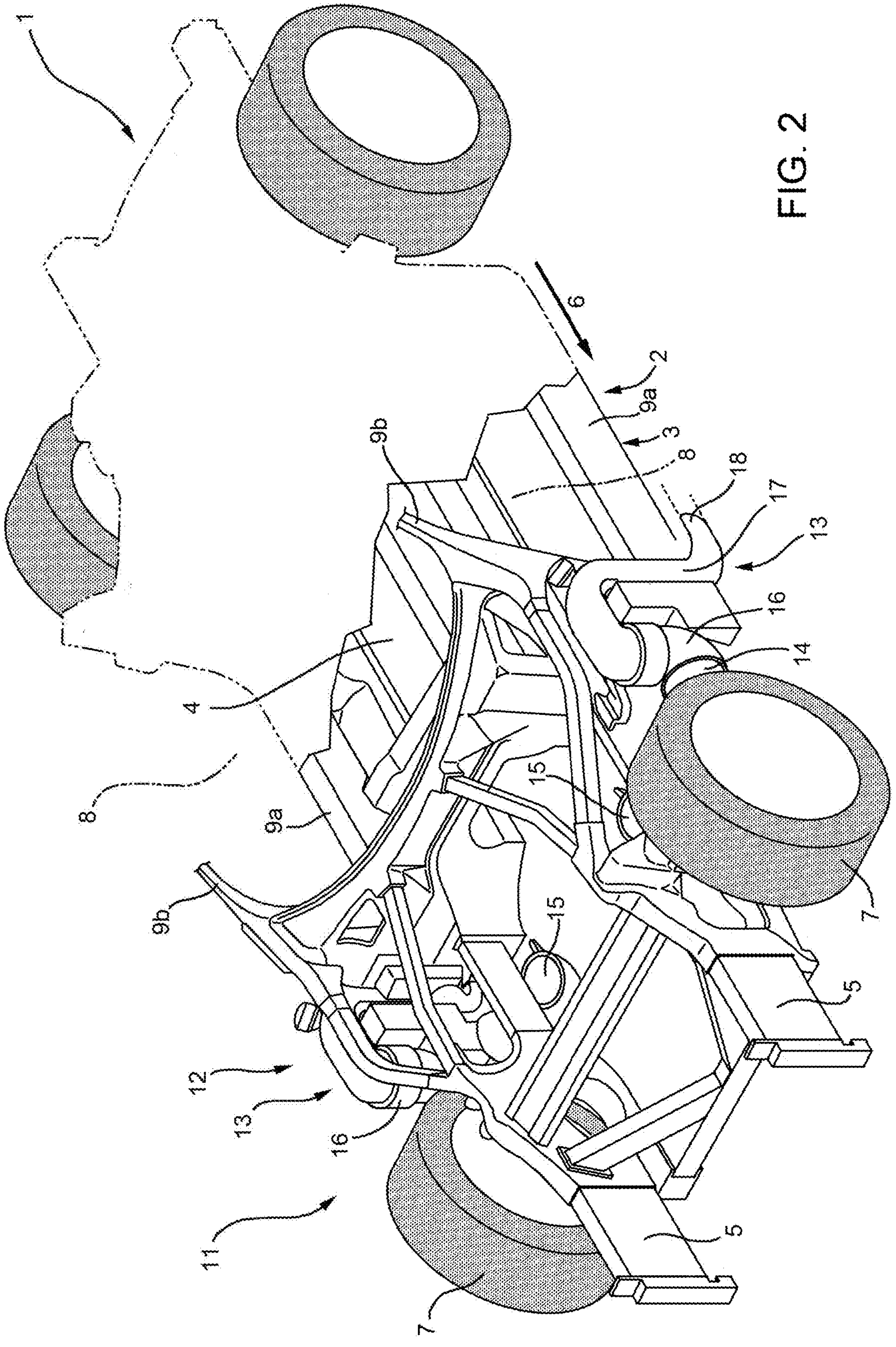
FIG. 2 is a schematic perspective view, with parts removed for greater clarity, of the road car of FIG. 1.
Figure 3:
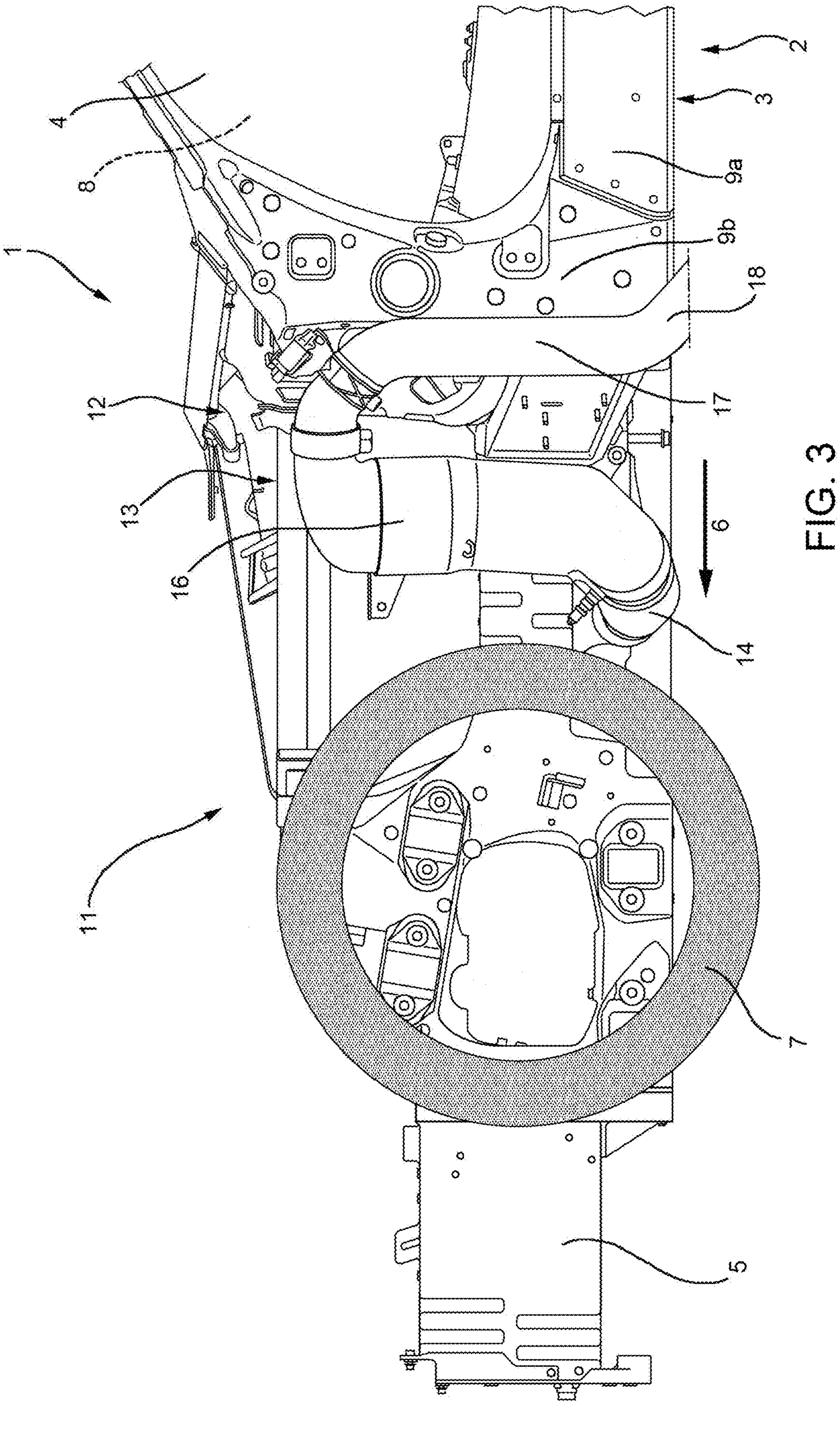
FIG. 3 is a schematic side view, with parts removed for greater clarity, of a detail of the road car of FIGS. 1 and 2.

With reference to FIGS. 1, 2 and 3, number 1 indicates, as a whole, a road car comprising a support frame 2 defining at least part of a lower floor 3 of the road car 1 and a passenger compartment 4 mounted on the frame 2 and projecting upwards from the floor 3.

The frame 2 is provided with two front struts 5, which project in front of the passenger compartment 4, extend substantially parallel to a travel direction 6 of the road car 1 and support a front axle provided with two front wheels 7 mounted on the outside of the struts 5.

The passenger compartment 4 is provided with two access doors 8, each extending above an under-door side member 9*a* with an elongated shape defining part of the frame 2.

Each door 8 is connected to a relative elongated pillar 9*b*, which extends upwards from the floor 3 and is mounted between the relative side member 9*a* and the relative wheel 7.

The car 1 further comprises a known engine 10, in this case an internal combustion engine, mounted in a front area 11 of the frame 2, in front of the passenger compartment 4, and in a symmetry plane of the car 1, in particular parallel to the direction 6.

The engine 10 is connected to the wheels 7 in a known way and is associated with an exhaust system 12 to let out the exhaust gases produced by the engine 10.

The system 12 comprises a pair of side exhaust ducts 13, each at least partly extending between a relative under-door side member 9*a* and a relative wheel 7, being at least partly aligned with the relative wheel 7 parallel to the direction 6 and being configured to absorb at least part of the kinetic energy produced by a front crash of the car 1.

Each duct 13 comprises an inlet segment 14, which has an inlet mouth 15 connected to the motor 10, extends in a substantially horizontal containing plane and projects between the relative wheel 7 and the relative under-door side member 9*a*.

The duct 13 further comprises an intermediate segment 16 extending upwards from the segment 14 between the relative wheel 7 and the relative under-door side member 9*a*.

The duct 13 finally comprises an outlet segment 17, which is connected to the segment 16, extends downwards starting from the segment 16 and has an outlet mouth 18 located under a containing plane of the floor 3.

In this case, the segment 16 and the segment 17 extend between the relative wheel 7 and the relative pillar 9*b*.

The position of the side exhaust ducts 13, in particular of the intermediate segments 16 and of the outlet segments 17, allows the ducts 13 to let out the exhaust gases produced by the engine 10 and, in the event of front crashes of the car 1, to limit the front wheels 7 getting close to the passenger compartment 4 and to absorb at least part of the kinetic energy generated by such front crashes.

As a result, the car 1 has some advantages that are mainly due to the fact that the side exhaust ducts 13 make it possible to avoid the use of auxiliary buffer struts and/or of relatively heavy support frames.

The invention claimed is:

1. A road car comprising:

a support frame defining at least part of a lower floor of the road car;

a passenger compartment projecting upwards from the lower floor;

a front engine mounted in front of the passenger compartment;

two under-door side members, which define part of the support frame and are each mounted under a relative access door of the passenger compartment;

a front axle provided with a pair of front wheels; and an exhaust system to let out the exhaust gases produced by the front engine; and wherein the exhaust system comprises a pair of side exhaust ducts, each side exhaust duct of said pair of side exhaust ducts at least partly extending between a corresponding one of a pair of under-door side members and a corresponding one of the pair of front wheels, being at least partly aligned with the corresponding one front wheel parallel to a travel direction of the road car and being configured to at least limit the movement of the corresponding one front wheel following a front crash of the road car;

wherein the support frame comprises two elongated pillars, which extend upwards from the lower floor and are each mounted between one corresponding under-door side member and one corresponding front wheel;

wherein each side exhaust duct at least partly extends between a corresponding one elongated pillar of the two elongated pillars and the corresponding one front wheel.

2. The road car according to claim 1, wherein the front engine is mounted in a longitudinal symmetry plane of the road car.

3. The road car according to claim 1, wherein each side exhaust duct comprises an inlet segment, which has an inlet mouth connected to the front engine and projects between the corresponding one front wheel and the corresponding one under-door side member.

4. The road car according to claim 3, wherein the inlet segment extends in a substantially horizontal containing plane.

5. The road car according to claim 3, wherein each side exhaust duct further comprises an intermediate segment extending upwards from the inlet segment between the corresponding one front wheel and the corresponding one under-door side member.

6. The road vehicle according to claim 5, wherein each side exhaust duct further comprises an outlet segment, which is connected to the intermediate segment and extends downwards starting from the intermediate segment.

7. The road car according to claim 6, wherein the outlet segment has an outlet mouth located under a containing plane of the lower floor.

8. The road car according to claim 1, wherein the support frame further comprises two front struts, which extend between the pair of front wheels starting from the passenger compartment and carry, connected thereto, the pair of front wheels.

* * * * *